Jan. 22, 1924.

R. PLUMB 1,481,431

CONVEYING METHOD AND APPARATUS

Filed Nov. 17, 1920      3 Sheets-Sheet 2

Jan. 22, 1924. 1,481,431

R. PLUMB

CONVEYING METHOD AND APPARATUS

Filed Nov. 17, 1920  3 Sheets-Sheet 3

Inventor
Ralph Plumb
By his Attorney

Patented Jan. 22, 1924.

1,481,431

UNITED STATES PATENT OFFICE.

RALPH PLUMB, OF BUFFALO, NEW YORK.

CONVEYING METHOD AND APPARATUS.

Application filed November 17, 1920. Serial No. 424,627.

*To all whom it may concern:*

Be it known that I, RALPH PLUMB, a citizen of the United States, and resident of Buffalo, in the county of Erie and State of New York, have invented certain new and useful Improvements in Conveying Methods and Apparatus, of which the following is a specification.

My present invention relates to methods and apparatus for conveying perforated stock, primarily to the conveying of pieces of stock of generally annular form, and more particularly to heavy stock in the form of rings.
In its more specific application, the invention is concerned with the handling of heavy metal rods in bundle coil form, particularly in conveying the same from the muffle in which it is treated to a pickling house, a storage yard, a car, or the like, preparatory to further treatment, storage, or transportation, as the case may be.

According to a feature of the invention the coils are delivered from the muffle in succession, and are transferred, a plurality or group at a time, to the place where they are to be subjected to the next treatment or to be stored, the transfer being affected by the use of a member, preferably a chain, passed through the perforations of the said group or plurality of coils.

According to another feature of the invention the coils are deposited in succession upon a support adjacent the muffle, all of the coils which are at any instant upon the support being shifted after the delivery of each coil in a direction away from the muffle for the deposit of the next coil adjacent thereto.

In its preferred form the apparatus for carrying out the above features preferably comprises a continuous preferably intermittently moving conveyer that receives the coils from the muffle and in succession, the conveyer carrying rests at definite intervals for supporting the coils in nearly upright position.

According to another feature of the invention each group of coils is deposited upon the floor or other support, intermediate coils first, and then pairs of the coils are moved successively toward and into contact with opposite ends of those coils of the group which have been previously deposited.

According to another feature of my apparatus an inclined slideway is provided along which the coils pass by gravity from the muffle conveyor to the delivery platform, a slowly moving stop being preferably associated with the slideway for limiting the rate of descent of the coils therealong to ease the shock of the impact with the platform.

The method in its most specific application is concerned with the conveying of massive metal rings or coils of the type used as stock for the making of bolts or nuts. The outside diameter of these coils is in the neighborhood of 44 inches and the inside diameter from 34 to 35 inches and the weight nearly 400 pounds. The preferred manner in which the method is carried out is by depositing the coils in succession as they leave the muffle upon a moving conveyor, the coils being disposed in nearly upright position, passing a suspension chain through a group of ten to fifteen of these coils, picking the chain up in an overhead crane, moving the crane and lowering it with the suspended load to deposit the coils in the place desired. Before the suspension chain is lowered the coils will in general radiate downwardly therefrom with an intermediate coil or coils at the lowermost point, the lower edges of the coils to both sides thereof being at successively higher levels, so that as the chain is lowered the said intermediate coil or coils will reach the floor first and the other coils will follow successively in pairs which concurrently move toward and into contact with opposite ends of the group of coils therebetween.

In the accompanying drawings is shown a preferred form of apparatus embodying my invention, and by which my method of operation is preferably carried out.

In the drawings,

Figure 1:
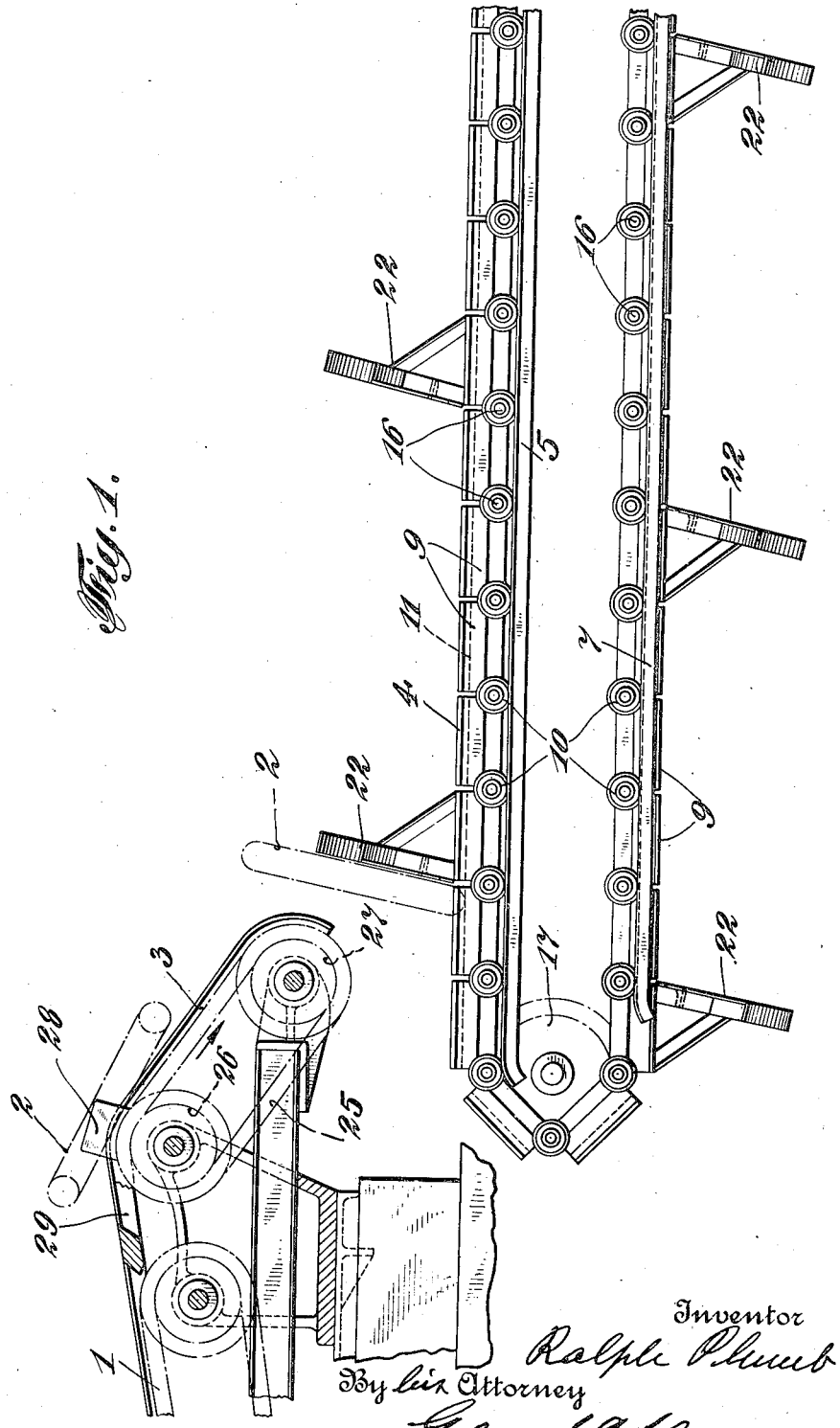
Figure 1 shows a diagrammatic view of a section of conveying apparatus embodying my invention, showing the muffle end thereof.

Referring now to the drawings, I have shown in diagrammatic manner the muffle conveyer 1 extending from a muffle (not shown). The conveyer is shown as of a continuous type and delivers the coils, one of which is shown at 2, to an inclined slideway or chute 3 to be described below, for deposit upon a delivery conveyer preferably in the form of a loop 4.

The delivery conveyer comprises by preference an upper pair of tracks 5 and 6 and a lower pair of tracks 7 and 8 upon which ride wheels or rollers of the continuous conveyer loop 4. This loop comprises a multiplicity of buggies 9, each provided with wheels 10 to ride upon the tracks, the buggies being connected in succession to form a closed loop. Each buggy comprises a base member 11 provided with integral lugs 12 extending downwardly and outwardly from opposite ends thereof. The lugs at adjacent ends of successive buggies are aligned with each other transversely of the conveyer and axles 16 for the wheels pass each through a set of registering openings in the aligned lugs. Each axle thus serves as a pin for securing successive buggies together, the elements of the loop readily flexing about the pins or axles 16 as they pass about the end driving members 17 and 18.

The conveyer loop is driven by any suitable source of power such as a motor 19 through a transmission which by preference comprises a coupling 20 and appropriate reduction gear connection 21. At fixed intervals the conveyer loop has rests 22 for the coils, each rest preferably comprising a support portion 23 secured to the body of a buggy or truck, and carrying a V-shaped upper rest portion 24 secured thereto in any desired way. By preference the space between successive rests is such as to accommodate ten to fifteen coils.

A continuous chain 25 is mounted about a pair of rollers 26 and 27 immediately below the slideway, the chain carrying a lug 28 which extends through a longitudinal slot 29 in the slideway. In operation, the chain 25 is moved slowly and continuously about the rollers and in the direction of the arrow. The device is so timed that as each coil is delivered to the slideway the lug 28 will enter the hole thereof and the further descent of the coil along the slideway will be at the rate of movement of the lug. The coil will therefore be deposited upon the delivery conveyer with relatively little impact or vibration. In operating the motor 19 moves the conveyer loop 4 intermittently through a small range after deposit of each coil. This movement may be effected by a manual control to throw power upon the motor at proper intervals, that is, after deposit of each coil to advance the conveyer by a distance equal to approximately the thickness of a coil. Each coil will, therefore, be deposited upon the conveyer loop to rest snugly against the previously deposited coil.

Figure 2:
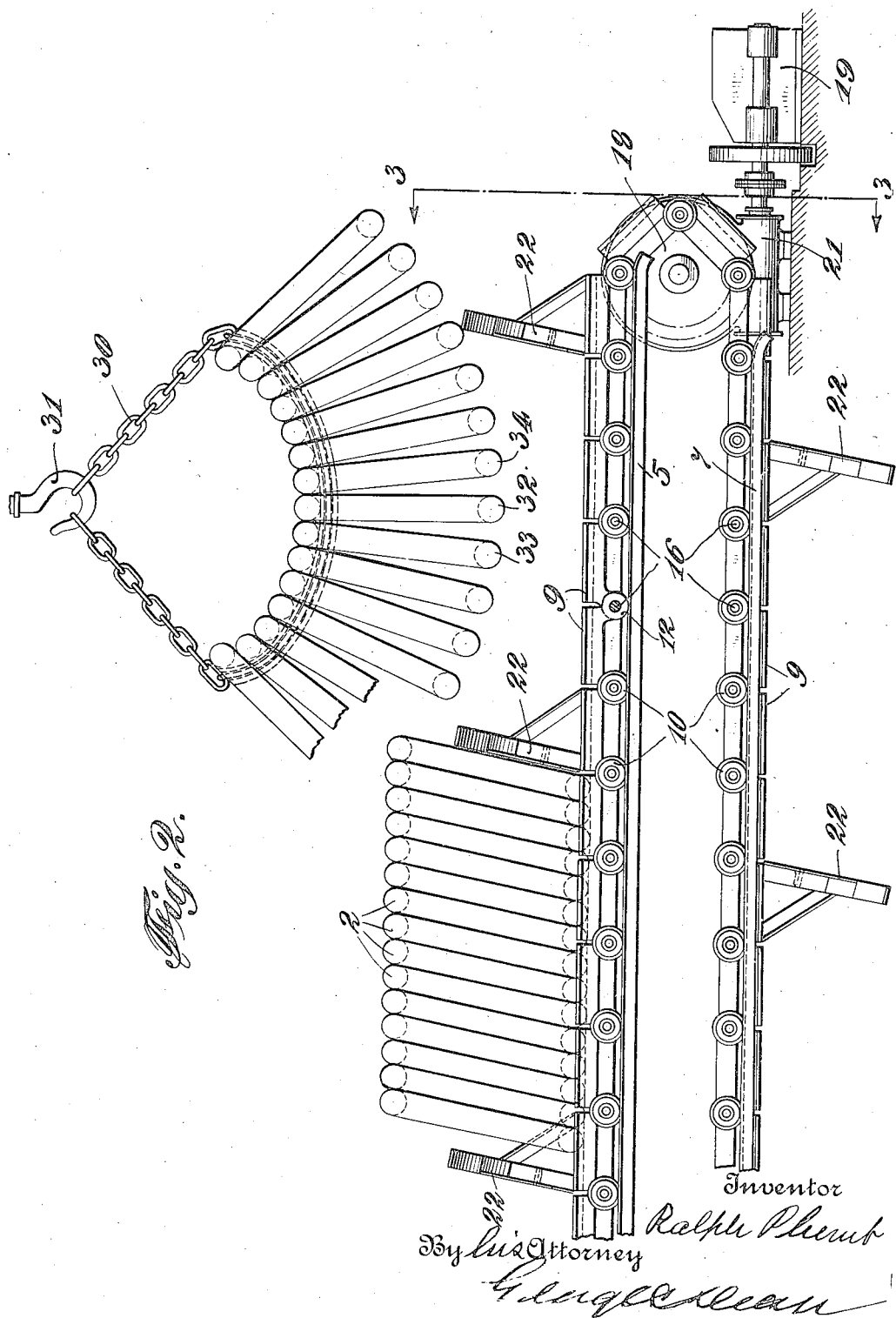
Figure 2 is a view similar to Figure 1, showing the delivery end and showing a group of coils lifted from the conveyor.
Figure 3:
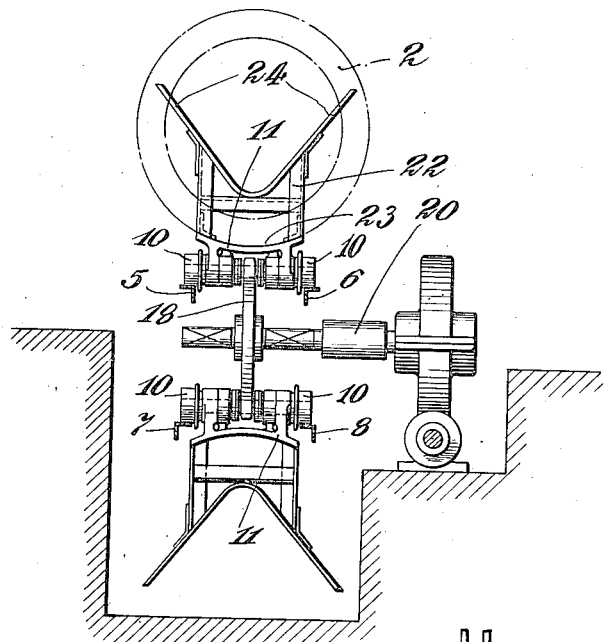
Figure 3 is an end view of Figure 2.
Figure 4:
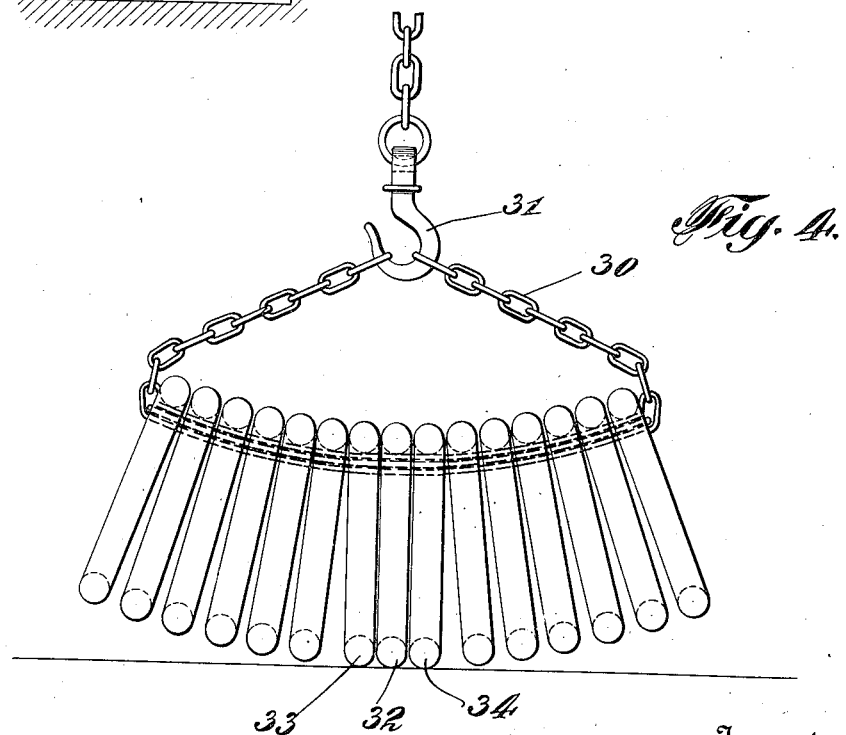
Figure 4 is a view of preferred apparatus for executing the method of depositing a group of coils.

As the group of coils between the successive rests approaches the right hand end of the conveyer, a chain 30 is drawn through the perforations of said group, preferably by hand, the ends of the chain are attached as shown to the hook 31 of an overhead crane (not shown) which lifts the coils from the conveyer loop, transports them to the place desired and then deposits them in place upon the floor of the car or in the pickling house or in a storage place, as desired. The rests 22 being open at their upper ends will not interfere with the upward movement of the chain. The chain is preferably approximately two and one-quarter times the combined thickness of the coils to be transported in the group so that when the coils are suspended from the chain, the latter will have substantially the pear-shaped conformation shown in Fig. 2, in which that portion of the length of the chain upon which the coils rests will have substantially the form of a parabola with its curvature extending upwardly. The individual coils suspended from the chain will radiate substantially symmetrically as shown, an intermediate coil 32 at the lowermost point, the lower edges of the coils to both sides thereof being at successively higher levels. As the chain is lowered the bottom of the intermediate coil 32 will first touch the floor and be thereby released from the supporting influence of the chain. As the chain descends further the two coils 33 and 34 to the right and left respectively of the coil 32 will move concurrently toward and into engagement therewith, until they touch the floor. The component of gravitational force which urges the coil 33 along the chain toward the left is equal and opposite to the component which urges coil 34 toward the right. End thrusts tending to throw the coils upon their sides are thus eliminated. The same neutralizing of end thrusts takes place as the pairs of coils reach the floor successively. Thus I have provided an effective method for conveniently, quickly and at little expense depositing a group of identical units of heavy stock in substantially upright position and in alignment upon a flat surface such as a floor. After the chain is passed through a group of coils it is preferably left in place so that the group can be transported successively to various points for operations to which the coils are to be subjected, without the need for applying and removing the chain for each transfer. When the coils are deposited finally in stock or upon a car for shipment, the chain is preferably withdrawn, to be used again in the same manner upon another group of coils.

Thus, by my method the coils are delivered from the muffle in succession and placed with their perforations in alignment, upon the slowly traveling delivery conveyer. The coils are transported a plurality at a time by drawing a chain through the perforations thereof, carrying the chain with the suspended coils by means of a crane, and neatly depositing the coils in alignment and in upright position wherever desired, by the simple process of lowering the chain with the coils suspended therefrom.

If the method is employed of picking the coils off singly from the top of the muffle by an overhead hook conveyer with hooks spaced at regular intervals, each coil must be individually attached by hand and individually removed for unloading, and be individually deposited for subsequent treatment and storage. By my method, I have eliminated substantially all of this hand work.

It will be understood that the invention is applicable to coils of different sizes, weights and shapes. It will also be apparent that the broad method of depositing the coils upon a floor or flat surface in successive pairs is applicable also to non-perforated stock.

Although I prefer to draw the chain only through the coils between two successive rests, it is understood that a longer chain could be drawn through the coils extending between three or more successive rests, carrying a greater number of the coils, and that in this event the intermediate rest or rests may be omitted if desired.

My method of transporting and neatly arranging objects such as heavy coils by the use of a suspension member such as a chain, is of general application apart from the muffle, although it has its preferred application when used in combination with the method and apparatus disclosed, for feeding the coils from a muffle to a delivery platform or conveyer.

I claim:—

1. The method of depositing a plurality of identical relatively heavy units into substantially upright position upon a horizontal flat surface and in alignment and in contact with each other, which consists in depositing one or more of said units, moving said units successively in pairs toward and into contact with opposite ends of the units between them, each unit being urged against the group with the same force as the unit moving concurrently therewith.

2. The method of depositing a plurality of identical relatively heavy perforated units of relatively small thickness upon a horizontal flat surface, which consists in suspending said units from a flexible carrying member and lowering the latter, so that an intermediate unit or units will first reach the flat surface, and thereupon the units will reach the surface successively in pairs, in contact with opposite sides of those previously deposited.

3. The method of handling heavy units of perforated stock which consists in delivering the units in succession from a muffle, with their perforations substantially aligned, drawing a flexible carrying member through said units, a plurality at a time, transporting the carrying member with the plurality of units suspended therefrom and lowering the carrying member to deposit the units substantially in upright position upon a flat horizontal support.

4. The method of handling metal rods formed in annular bundle coils having an internal diameter greater than the thickness of the bundle, which method consists in passing a flexible tension member successively through the annular openings of a considerable number of said coils, securing the ends of said tension member, vertically lifting said tension member by an effort applied at a point opposite and approximately midway the length of the coil train, transporting said tension member and coils while so suspended in pendant position and redepositing said coils on a suitable support in approximate alignment and in lateral contact by lowering the suspension point toward the support at the desired graduated rate.

5. The method of handling metal rods formed in annular bundle coils having an internal diameter greater than the thickness of the bundle. which method consists in passing a flexible tension member successively through the annular openings of a considerable number of said coils, securing the ends of said tension member, vertically lifting said tension member by an effort applied at a point opposite and approximately midway the length of the coil train, transporting said tension member and coils while so suspended in pendant position and redepositing said coils on a suitable support in approximate alignment and in lateral contact by lowering the suspension point toward the support at the desired graduated rate.

6. The method of handling metal rods formed in annular bundle coils, which method consists in looping suspension means through the annular openings of a considerable number of said coils and securing the ends thereof outside said coils; vertically lifting said suspension means by an effort applied to said suspension means at a point opposite and approximately midway the length of the coil train; transporting said suspenson means and coils while so suspended in pendant position; and redepositing said coils on a suitable support in approximate alignment and in lateral contact by lowering the suspension point toward the support at the desired graduated rate.

Signed at North Tonawanda, in the county of Erie and State of New York, this 15th day of November, 1920.

RALPH PLUMB.